(12) United States Patent
Rudmann et al.

(10) Patent No.: US 7,658,877 B2
(45) Date of Patent: Feb. 9, 2010

(54) MANUFACTURING MICRO-STRUCTURED ELEMENTS

(75) Inventors: Hartmut Rudmann, Winterthur (CH); Andreas Maciossek, Zürich (CH); Markus Rossi, Jona (CH)

(73) Assignee: Heptagon Oy, Espoo (FI)

( * ) Notice: Subject to any disclaimer, the term of this patent is extended or adjusted under 35 U.S.C. 154(b) by 624 days.

(21) Appl. No.: 10/541,008

(22) PCT Filed: Jan. 23, 2004

(86) PCT No.: PCT/CH2004/000032

§ 371 (c)(1), (2), (4) Date: Jul. 18, 2005

(87) PCT Pub. No.: WO2004/068198

PCT Pub. Date: Aug. 12, 2004

(65) Prior Publication Data

US 2006/0113701 A1    Jun. 1, 2006

(30) Foreign Application Priority Data

Jan. 29, 2003    (EP) .................................. 03405038

(51) Int. Cl.
*B29C 59/02* (2006.01)
(52) U.S. Cl. .................... 264/219; 264/320; 264/328.1; 425/175
(58) Field of Classification Search ................ 264/77, 264/219, 320, 328.1
See application file for complete search history.

(56) References Cited

U.S. PATENT DOCUMENTS

| | | | |
|---|---|---|---|
| 2,644,985 A | 7/1953 | Crandon | |
| 3,871,803 A | 3/1975 | Beattie | |
| 4,097,324 A | 6/1978 | Emmel | |
| 4,743,410 A | 5/1988 | Grethen et al. | |
| 4,812,346 A | 3/1989 | Sudo et al. | |
| 5,114,455 A | 5/1992 | Hirota et al. | |

(Continued)

FOREIGN PATENT DOCUMENTS

JP    577253    3/1993

(Continued)

OTHER PUBLICATIONS

WO 94/01262, Process for Manufacturing Micro-Structured Bodies Made of Plastics, Publication Date Jan. 20, 1994. (Corresponds to US 5,543,108).

*Primary Examiner*—Khanh Nguyen
*Assistant Examiner*—Saeed M Huda
(74) *Attorney, Agent, or Firm*—Rankin, Hill & Clark LLP

(57) ABSTRACT

According to the invention, a micro-structured element is manufactured by replicating/shaping (molding or embossing or the like) a 3D-structure in a preliminary product using an replication tool (1). The replication tool comprises a spacer portion (1*c*) protruding from a replication surface (1*a*). The replica (the micro-structured element, for example the micro-optical element or micro-optical element component) may be made of epoxy, which is cured—for example UV cured—while the replication tool is still in place. The replication process may be an embossing process, where the deformable or viscous or liquid component of the preliminary product to be shaped is placed on a surface and then the replication tool is pressed against this surface. As an alternative, the replication process may be a molding process.

8 Claims, 6 Drawing Sheets

U.S. PATENT DOCUMENTS

| | | | |
|---|---|---|---|
| 5,183,597 A * | 2/1993 | Lu ............................ 264/1.38 |
| 5,271,875 A | 12/1993 | Appleton et al. |
| 5,300,263 A | 4/1994 | Hoopman et al. |
| 5,543,108 A * | 8/1996 | Bacher et al. ............... 264/553 |
| 5,575,962 A * | 11/1996 | Takahashi ................... 264/2.5 |
| 5,620,720 A | 4/1997 | Glick et al. |
| 5,741,446 A | 4/1998 | Tahara et al. |
| 5,817,161 A | 10/1998 | Takagi et al. |
| 5,972,250 A | 10/1999 | Miyamoto et al. |
| 5,981,032 A | 11/1999 | Smith et al. |
| 5,988,820 A | 11/1999 | Huang et al. |
| 6,143,210 A | 11/2000 | Wrue et al. |
| 6,231,094 B1 * | 5/2001 | Uytterhaeghe et al. ...... 293/122 |
| 6,716,754 B2 * | 4/2004 | Hofmann .................... 438/690 |
| 2002/0093113 A1 | 7/2002 | Ansell et al. |
| 2002/0115002 A1 | 8/2002 | Bailey et al. |
| 2002/0133129 A1 | 9/2002 | Arias et al. |
| 2003/0105853 A1 * | 6/2003 | Morito et al. ............... 709/223 |
| 2003/0141276 A1 | 7/2003 | Lee |
| 2005/0167868 A1 | 8/2005 | Takeda et al. |

FOREIGN PATENT DOCUMENTS

WO            00/65408        11/2000

* cited by examiner

MANUFACTURING MICRO-STRUCTURED ELEMENTS

BACKGROUND OF THE INVENTION

1. Field of the Invention

The invention is in the field of manufacturing micro-structured elements such as micro-optical elements or micro-optical systems. It also extends to Micro-Electro-Mechanical Systems (MEMS) and combined micro-optical and electronic and/or mechanical systems such as Micro-Opto-Electro-Mechanical Systems (MOEMS). More concretely, it deals with a method of replicating—for example by an embossing or molding process—an element into a micro-structured element, with a replication tool, and with a method of manufacturing a replication tool.

2. Description of the Related Art

Micro-optical elements have gained increasing importance. Micro-optical elements here are elements of any kind that rely on micro-optics. The term 'micro-optical elements' here includes systems comprising electronic and/or mechanical components, such as, for example, the MOEMS. Micro-optics, as opposed to conventional optics, is based on fine structures causing refraction and/or diffraction, the structures having characteristic depths/heights and often also widths of typically a few micrometers, for example of 0,5 µm-200 µm, preferably of between 1 µm and about 50 µm or between 1 µm and about 30 µm. In other words, the characteristic profile depths and the profile widths are of the order of a few wavelengths up to a few tens of wavelengths for refractive optics and of about one wavelength up to a few wavelengths for diffractive optics. As a rule of thumb, micro-optical elements have structures such that the phase relation of radiation present at different neighboring places on the structure is well-defined. This is opposed to classical, purely refractive optical elements, where the behavior of the radiation at different elements of the structure can be described in a geometrical optics picture. Micro-optical elements, thus, as opposed to classical optical elements (such as classical lenses, mirror elements etc.) can be regarded as having structures which are such that the wave nature of the light has to be taken into account and participates in the effect the micro-optical element has upon radiation.

For manufacturing state of the art Diffractive Optical Elements (DOEs; being an example of Micro-Optical Elements), different methods are known. A first method is the manufacturing of a resist pattern using conventional photostructuring or electron beam structuring techniques relying on masks or the like. The resist pattern is used as a diffractive element. A second method includes the forming of a resist pattern using one of the mentioned techniques and then etching the substrate such that a diffraction element having a desired blazed shape is produced.

Other methods, such as the one disclosed in JP-A-168601/1988 rely on etching including structuring an etching stopper layer with a photolithographic process.

All these state of the art methods have in common that they are not very suitable for mass production, since the manufacturing of every element involves a series of elaborate production steps.

Therefore, it is an objective of the invention to provide a method of forming a micro-structured element which is suitable for producing micro-optical elements and overcomes drawbacks of prior art manufacturing methods. It should provide a good definition of the 3D-structural features and their absolute dimensions and positions, even if the micro-structured element is large or if an array of micro-structured elements is manufactured.

SUMMARY OF THE INVENTION

According to the invention, a structured (or micro-structured) element is manufactured by replicating/shaping (molding or embossing or the like) a 3D-structure in a preliminary product using a replication tool. The replication tool comprises a spacer portion protruding from a replication surface. A replicated micro-optical element is referred to as replica.

The spacer portions allow for an automated and accurate thickness control of the deformable material on the substrate. They may comprise "leg like" structures built into the tool. In addition the spacers prevent the deformation of the micro optical topography since the spacers protrude further than the highest structural features on a tool.

The replica (the micro-structured element, for example the micro-optical element or micro-optical element component or an optical micro-system) may be made of epoxy, which is cured—for example UV cured—while the replication tool is still in place. UV curing is a fast process which allows for a good control of the hardening process.

The replication process may be an embossing process, where the deformable or viscous or liquid component of the preliminary product to be shaped is placed on a surface of a substrate, which can have any size. For example it can be small-size having a surface area corresponding to the area of only one or a few elements to be fabricated. As an alternative, the substrate can be wafer scale in size. 'Wafer scale' refers to the size of disk like or plate like substrates of sizes comparable to semiconductor wafers, such as disks having diameters between 2" and 12". Then, the replication tool is pressed against this surface.

The embossing step stops once the spacer portions abut against the top surface of the substrate. Said surface thus serves as a stop face for the embossing.

As an alternative, the replication process may be a molding process. In a molding process, in contrast, the tool comprising the spacer portions, for example comprising leg-like structures, is first pressed onto the surface of a substrate to form a defined cavity which is then filled through a molding process.

The spacer portion is preferably available in a manner that it is 'distributed' over at least an essential fraction of the replication tool, for example over the entire replication tool or at the edge. This means that features of the spacer portion are present in an essential fraction of replication tool, for example, the spacer portion consists of a plurality of spacers distributed over the replication surface of the replication tool.

The spacers allow for an automated and accurate thickness control of the deformable material layer.

The replication tool may comprise materials with some elasticity, for example PDMS or another elastic material. Then, it gives a conformal thickness control even if the substrate surface, on which the process is executed is not perfectly planar, or if the replication tool is not perfectly planar. It should be noted that for many applications of micro-optical elements, planarity has to be ensured with a precision of up to around 1 µm over the element size or at an even higher precision. In other words, for micro-optical elements, the height of the features—the z position in a coordinate system where the tool surface defines the xy-plane—should preferably be defined with an accuracy of 1 micron or a higher accuracy.

The replication tool may further comprise a rigid back plate to make it dimensionally stiff on a large scale.

The spacer portion may be present anywhere where no optical function is located.

According to a special embodiment, spacers may be placed in corners and/or at edges of the final replica in order to decrease the stress concentration.

According to yet another special embodiment, the spacer portion may be laid out in a manner that fluid dynamic effects during the replication process are optimized. For example, the spacers can be designed in order to form a barrier to the flow of un-cured deformable replication material at the edge of the substrate. Alternatively, their shape and distribution can be such that it directs the flow of the deformable replication material during the embossing process, for instance to fill a rectangular replication area uniformly and completely.

In general, a replication tool can contain the following features: micro-optical function, spacers, dicing marks, alignment features (for aligned replication, optically or mechanically), flow barriers to stop or re-direct the flow of deformable material. Such structures can be added directly to a master in a mastering process such as a lithographic process or a laser beam writing process. For example during laser writing, however, frequently an individual mastering technology does not allow to include all features in a master structure due to limitation in the possible writing depth or area that can be achieved. In such a case an existing master, sub-master or tool has to be retrofitted with features such as spacers.

The invention also features a method of manufacturing a replication tool (being a for example a negative copy of a master structure) from a master or a sub-master. A master structure refers to an original structure. Any copy of a master is called sub-master. Masters are typically created by techniques such as photo structuring, laser beam writing or e-beam structuring. In addition, the invention also concerns a method of retrofitting an existing master, sub-master or tool with a spacer portion.

BRIEF DESCRIPTION OF THE DRAWINGS

In the following, embodiments of the invention are discussed with reference to drawings. The figures in the drawings are all schematic. They show the following.

DESCRIPTION OF THE PREFERRED EMBODIMENTS

Figure 1:
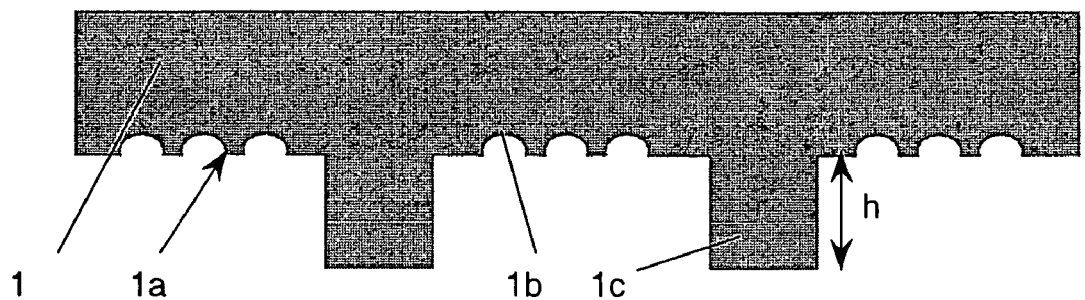
FIG. 1: A cross section through a replication tool according to the invention.

The replication tool 1 shown in FIG. 1 comprises a replication surface 1a with negative structural features being a negative of structural features to be shaped on a surface of a micro-optical element. More concretely, the embodiment shown very schematically in the figures has indentations 1b corresponding to protrusions of a surface of a micro-optical element. Typical dimensions (characteristic depths/heights and often also widths) of the structural features are a few micrometers, for example 0.5 µm-200 µm, preferably between 1 µm and about 50 µm or between 1 µm and about 30 µm. The replication tool further has spacers 1c protruding from the replication surface. The height h of the spacers is for example between 2 µm and 1000 µm, preferably between 2 µm and 200 µm, for example between 10 µm and 40 µm, and it usually is such that the spacers protrude further than the highest negative structural features. The geometrical dimension (shape, height, diameter) and the distribution of the spacers can be an important parameter in the system design as well as in the process development. The optical function can be fine tuned with a proper spacer design. More generally, the desired optical function also implies a certain maximum tolerance. Especially if the fabricated micro-optical (or other) structured element is large in size, these maximum tolerances may be strict. The method according to the invention allows the design of a tool satisfying these conditions. Depending on the physical properties of the replication material, the spacer properties will be adapted to guarantee a good processing.

The replication tool 1 is for example made of a material with some elasticity. It may be made of PDMS, or of some other elastic or stiff—curable or thermoplastic polymer or other formable material. It may, as an alternative, also be made of a metal, such as a Ni alloy or an alloy of another transition element or another metal. It may also be made of semiconductor material (such as an etched wafer) or of an insulating crystalline or amorphous material. The replication tool 1 in FIG. 1 for reasons of simplicity is drawn as one homogeneous body. In practice, it may be made up of several material layers or components. For example, the structural features and/or the spacers may be made of a material different from the tool body, and the tool may further comprise stiffening carrier elements as shown below or other elements. The replication tool may, according to yet another alternative, be composed of an elastic layer and a stiffer, patterned layer which carries the desired pattern.

Figure 2:
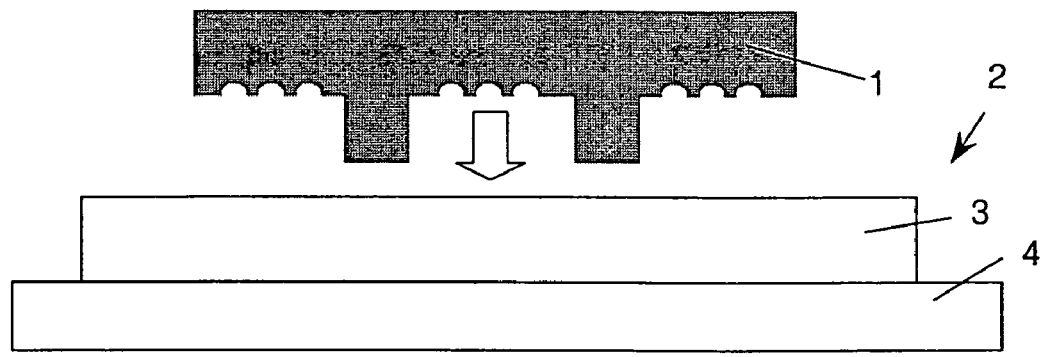
FIGS. 2, 3 and 4: Process steps in a process for manufacturing a micro-optical element.
Figure 3:
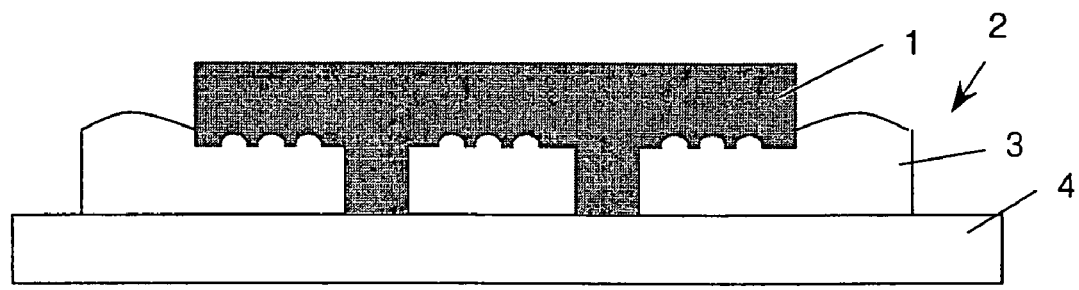
Figure 4:
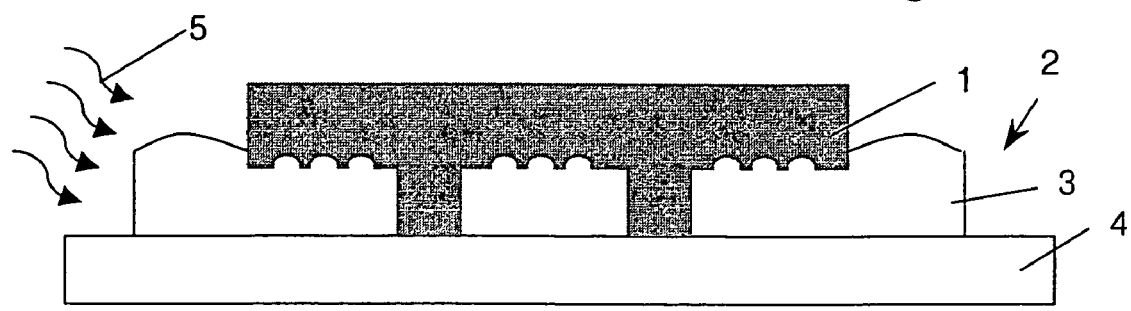

A process for forming a micro-optical element is very schematically shown in FIGS. 2-4. A replication tool 1 is brought into contact with a preliminary product 2 having, at a surface, a material component 3 which is in a deformable state (FIG. 2). The preliminary product 2 further comprises a second material component 4 (substrate) which is dimensionally stiff. The replication tool is pressed against the deformable material component 3 up to the point where the spacers abut against the surface of the dimensionally stiff material component 4 (FIG. 3). Said surface thus serves as a stop face for the pressing. As an alternative to the shown embodiment, a stop face may also be formed by other ways. For example, the preliminary product 2 does not have to comprise a dimensionally stiff component but, as an alternative, may be placed on a stiff carrier, such as a glass plate or the like. Where the replication tool is still in place, the deformable material component 3 may be hardened, for example by illumination with appropriate radiation 5 (FIG. 4), by heating, by cooling, by exposing to oxygen, by waiting during a certain time for letting it dry, or the like, etc., depending on the nature of the deformable material.

Figure 5:
FIGS. 5, 6, 7 and 8: Process steps in a process of manufacturing a master by to retrofitting an existing original master with spacers for the replication tool production.
Figure 6:
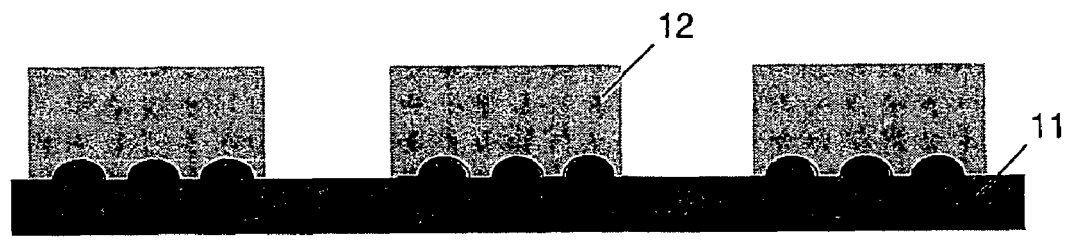
Figure 7:
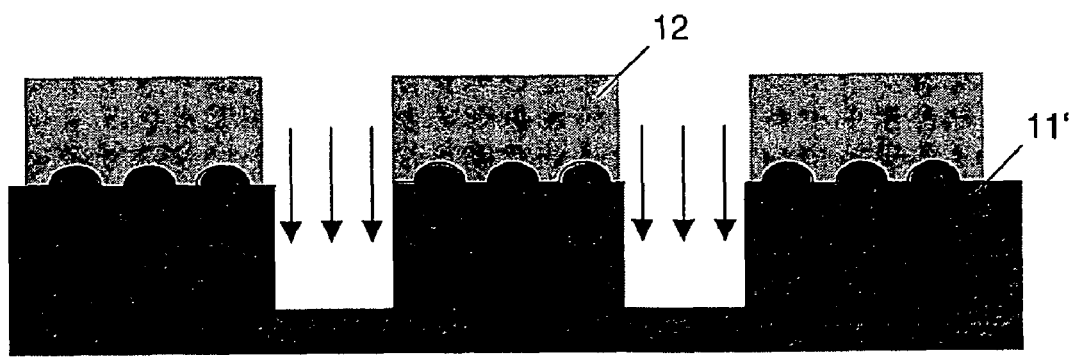

FIGS. 5-8 schematically outline a preferred method of retrofitting a master or sub-master structure with spacer to fabricate a tool of the kind shown in FIG. 1. An original (master) 11 comprises the (positive) structural features that are required for the micro-optical element to fulfill its function. The original is provided with an etch resist layer 12 that is structured (FIG. 6), for example in a conventional manner by photolithographic techniques. The structure of the resist layer 12 corresponds to a negative of the pattern, in which the spacers 1c are arranged. As a next step, negative structures for the spacers are etched into the original 11, for example by a plasma with the Reactive Ion Etching (RIE) technique (FIG. 7). The resist layer 12, in this process, serves as an etch resist. Then, the resist layer 12 is stripped from the resulting master 11 (FIG. 8) or sub-master. The replication tool 1 (cf. FIG. 1) is obtained by replicating the retrofitted master or sub-master, for example molding or embossing (if the tool is of a plastic material) by electroforming (if the tool is metallic) or by some other method.

Figure 8:
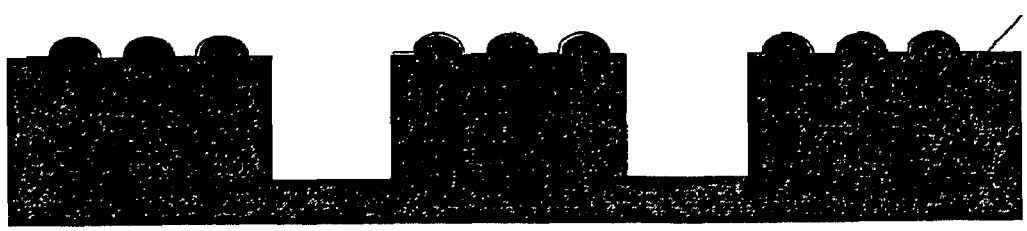
Figure 9:
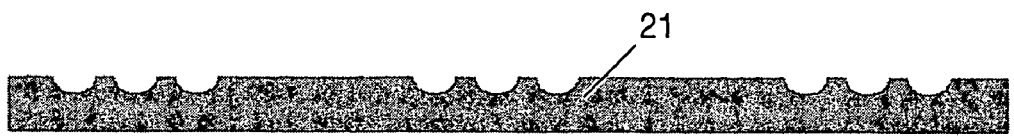
FIGS. 9, 10, 11, 12 and 13: Process steps in a process to retrofit a negative copy of a master or a tool with spacers for the replication tool production.
Figure 10:
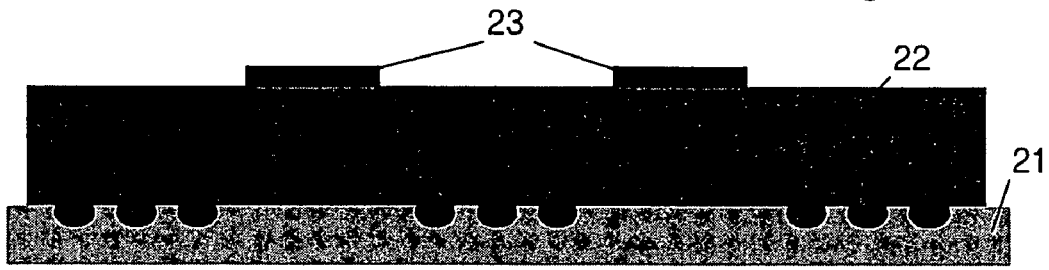

It should be noted that all figures are not to scale, and that the thickness of the original 11 in FIGS. 5 and 6 is shown reduced compared to its thickness in FIGS. 7 and 8. The original may be a 'conventional' master or sub-master that is to be provided with a spacer portion.

An alternative manufacturing method of retrofitting a negative copy of a master or a replication tool 1 is shown in FIGS. 9-13. It comprises the steps of providing a master 11 (as shown in FIG. 5), replicating it so that a negative copy or tool 21 is created (FIG. 9), for example made of a plastic material such as PDMS. Adding a coating layer 22 (FIG. 10) and structuring it (FIG. 11) so that the protrusions remain at the place of the spacers. The structuring may for example be done by a photolithography process using a structured resist layer 22, 23 and an etching step that does not attack the negative master or tool material 21.

Figure 11:
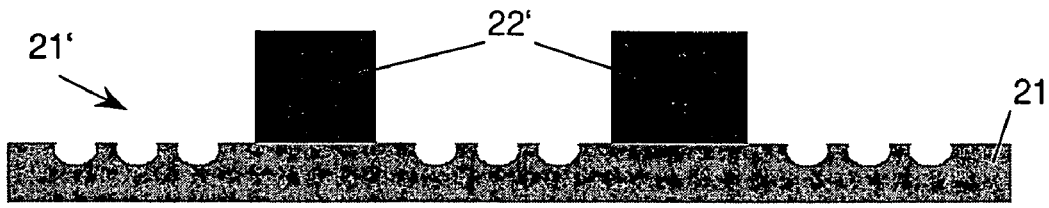
Figure 12:
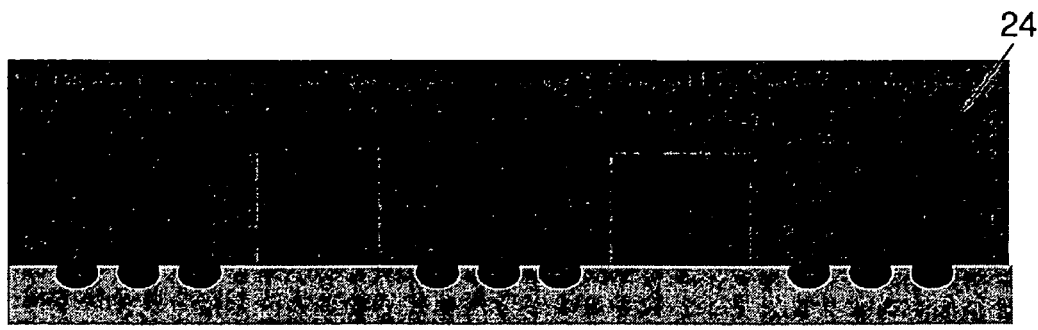
Figure 13:
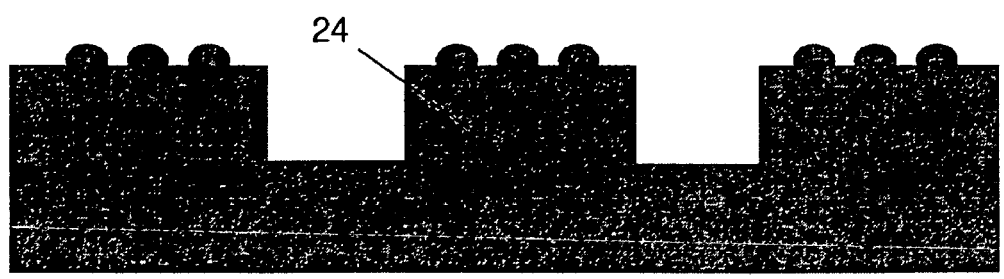

The resulting sub-master tool 21' shown in FIG. 11 comprises the sub-master tool original 21 and the protrusions 22' remaining from the coating layer. Then, the sub-master structure in FIG. 11 is replicated yielding a sub-master 24 as shown in FIG. 13. The final replication step allows the fabrication of several retrofitted masters, which can be of advantage for mass production.

The procedure involving a sub-master tool and a sub-master has some additional advantages and may be used also in cases other than the process of FIGS. 10-13. Since only a limited number of replicas (maybe up to a few 100) can be produced from a PDMS tool, it is important to have a constant supply of PDMS tools for mass production. However, in order to improve the life time of the master, its handling and the number of tools made from the master should be kept to a minimum. The intermediate step involving a sub-master tool and a sub-master, where the sub-master acts as master for the tool production that is used for mass production of replicas, is a suitable means. The sub-master can, for example, be made of the same epoxy as the final replica. The additional step of a sub-master leads to a further multiplication of the possible amount of replicas.

Figure 14:
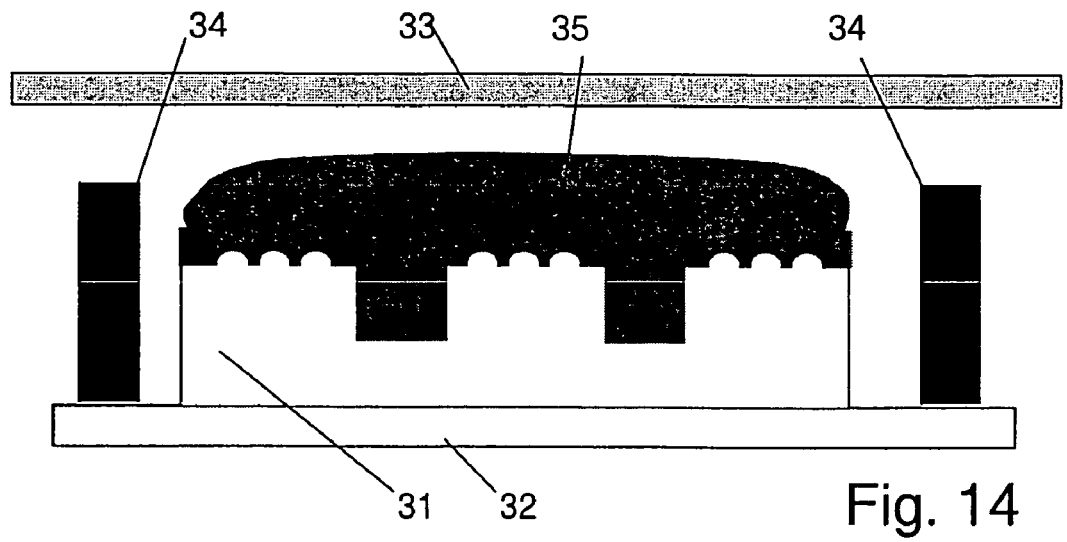
FIGS. 14, 15 and 16: Process steps in a process for manufacturing a replication tool from a master or a copy of a master.
Figure 15:
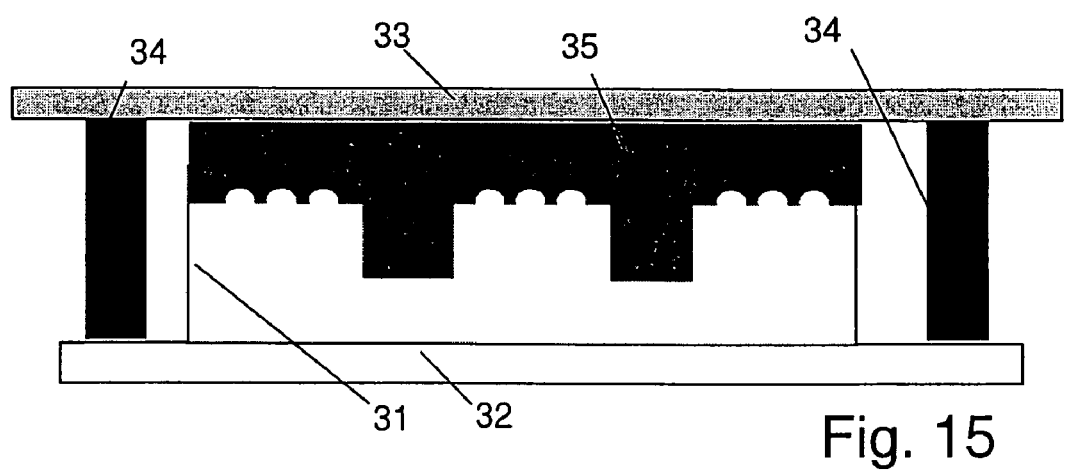
Figure 16:
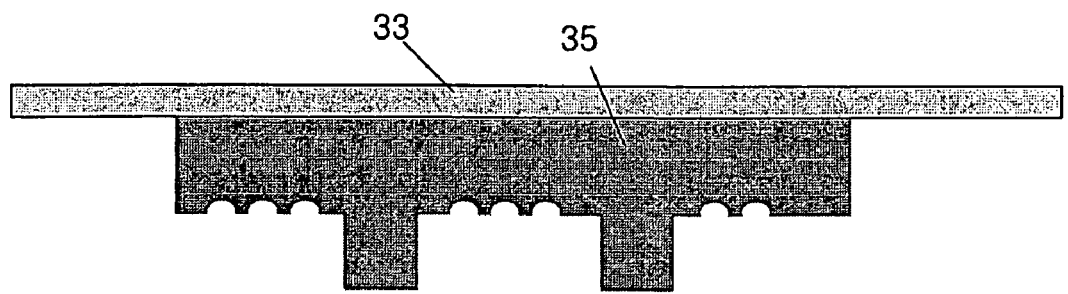

In FIGS. 14-16, a process to fabricate a replication tool from a master structure or sub-master is shown. The master or sub-master 31 is placed on a carrier element 32, such as a glass plate or the like, for example fastened to it (FIG. 14). Next, a liquid or viscous material 35, such as PDMS, is poured over the master or sub-master 31 to completely cover it. Then, a rigid back plate 33 is placed on top of the material (FIG. 15).

A rigid back plate provides an improved stability in the replication process. It may be made of glass, Polymethylmetacrylate (PMMA), Polycarbonate (PC) or any other suitable dimensionally stiff, essentially hard material.

External spacer elements 34 cause its position to be horizontal and control the overall thickness of the replication tool. Depending on the sticking properties of the liquid or viscous material and of the rigid back plate, a glue layer (such as an epoxy layer or the like, not shown) may be placed between the rigid back plate and the liquid or viscous material. As an alternative, the back plate may be spin coated with and adhesion promoter and then dried. Then, the liquid or viscous material is hardened—in the example of a PDMS tool by drying at room temperature or at an elevated temperature—to provide a stiff tool, possibly with some residual elasticity. Finally, the master or sub-master may be removed (FIG. 16). The master or sub-master may—not only in this example—additionally have a special release layer such as a Teflon® layer for easing release of the tool from the master or sub-master.

Of course, the method shown in FIGS. 2-4 may be executed using a tool with a rigid back plate 34 as shown in the figures.

Figure 17:
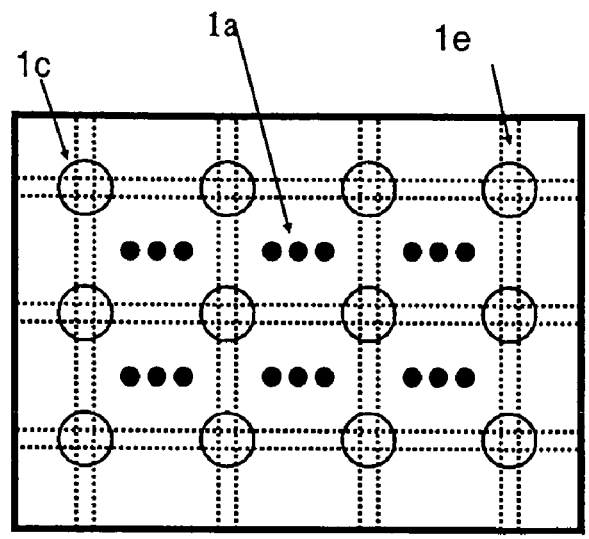
FIGS. 17 and 18: Examples of bottom views (i.e. views on the replication surface) of replication tools.

An example of a bottom view of a replication tool is shown in FIG. 17. The replication tool comprises a pattern of regularly arranged spacers 1c which can be located on streets for a later dicing process. Positions with negative structural features on the replicating surface 1a for replicating micro-optical components are symbolized by filled circles. Micro-optical features can also contain positive structural features i.e. extending in the direction of the spacers. Then it is important that the spacers protrude further than the deepest positive micro-optical structure. The embossing surface (containing the micro-optical function) in FIG. 17 is contiguous, whereas the spacer portion comprises a plurality of discrete spacers 1a.

A typical width of a spacer is about 100-1000 μm, a typical height about 2-200 μm. Typically, the spacers are arranged in a pitch (distance between neighboring spacers) of about 0.5-200 mm, 0.5-20 mm or 0.5-5 mm.

All above described fabrication processes may be made on complete wafers (sizes: 2" to 8" in diameter).

Figure 18:
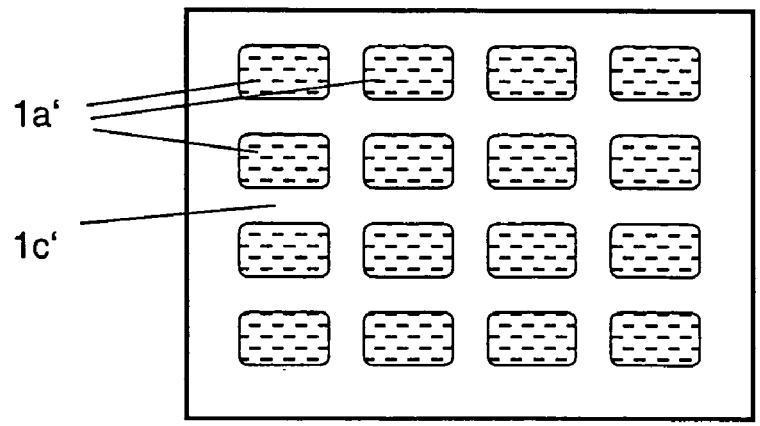

The replication tool of FIG. 18, in contrast to FIG. 17 comprises a contiguous spacer portion. In contrast, the replicating surface 1a' with the negative structural features comprises a plurality of discrete replicating surface sections in indentations (symbolized by rectangles with rounded edges) in the spacer portion. Replication with a tool as shown in FIG. 18 results in replicated protruding structures.

Other spacer portion shapes are possible, for example, the spacer portion may be a spacer grid, consist of a plurality of spacer rings, etc.

According to a special embodiment, the spacer portion is laid out in a manner that the fluid dynamics during the replication process is optimally controlled. For example, the spacer portion may comprise a plurality of spacers or a contiguous spacer portion arranged in one or several complete or incomplete borders or rings at the edge of an intended replication area (and at least partially surrounding it) to stop the flow or re-direct uncured replication material during the embossing process. This can be in particular required in order to prevent any replication equipment from contamination. In a more general form of this embodiment, such described "flow stop spacers" can also act to form isolated replication areas, as well as replication areas with holes (i.e. non-replicated parts) or arbitrarily defined outlines.

Figure 19:
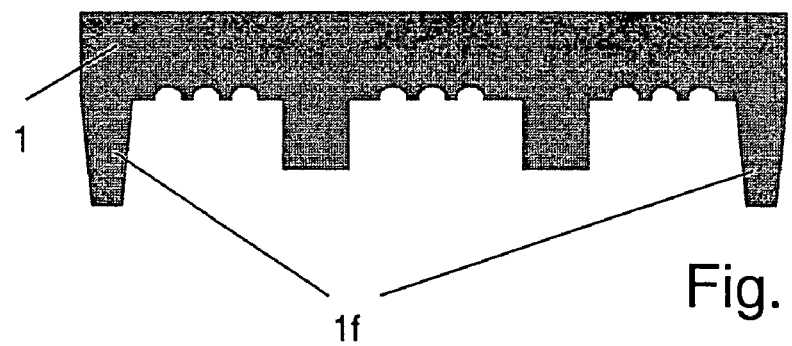
FIG. 19: A replication tool with alignment means at the edges.

As shown in FIG. 19, the replication tool may further comprise alignment structures, such as an alignment pin 1f or a plurality of alignment pins for positioning the replication tool in certain replication processes. The alignment pins engage in corresponding negative structures during the replication process. As an alternative or in addition, a tool can contain optical alignment marks (such as a cross) that support an optical the alignment during a replication process with respect to the substrate or during a double-sided replication.

Figure 20:
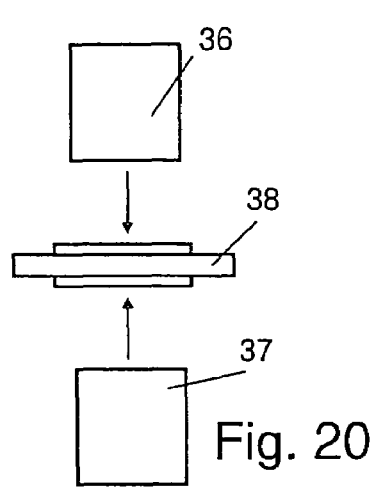
FIGS. 20 and 21: Examples of processes for double-sided replication.
Figure 21:
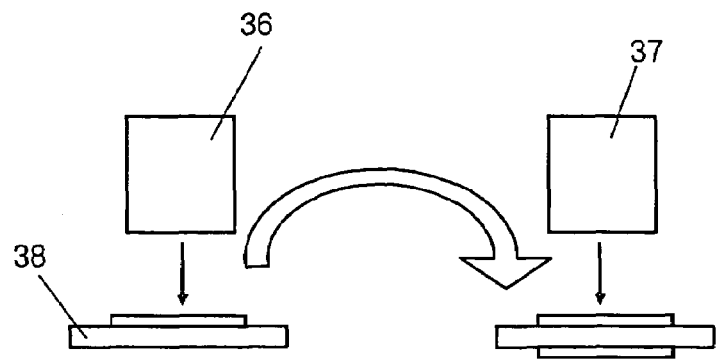

Alignment is of special importance in double-sided replication processes. FIGS. 20 and 21 show a schematic view of the double-sided replication process. In the first method (FIG. 20) the two aligned tools 36, 37 are placed on top and on the bottom side of the replica in a cast robot. With such an arrangement, the replication process works as follows. First, epoxy (it may, of course, be replaced by other suitable plastically deformable, viscous or liquid material) is dispensed on top of the bottom tool 37. A substrate 38—for example made of glass or of an other transparent material—is then placed on top of the bottom tool 37 at a certain distance which determines the thickness of the replication layer on the bottom side, and which is well defined by the spacer portion,. Next, the epoxy is hardened by being exposed to UV light to complete the process of the bottom side replication. For the top side replication, epoxy is dispensed on top of the glass substrate 38. The top tool is then placed at a certain distance, well defined by the spacer portion, to the substrate to perform the top side replication. The replication process is completed after UV exposure of the top replication layer.

A further replication method is shown in FIG. 21. In a first step, the replication process (stamping and UV curing) is performed on the top side of the substrate. Then the substrate is turned upside down and the replication is repeated on the second side of the substrate. During each replication process the second replication has to be aligned to the first replication. Such a process is very similar to what can currently be performed on a mask aligner.

Replication methods for double-sided elements have very strict tolerances in the front/back side alignment as well as in the replication layer thickness. Both may be as strict as in a range of 1-2 µm or even stricter. For double-sided elements, the overall planarity of the replication is very important; the requirement can be solved by the replication method and replication tools according to the invention. Further, some double sided elements, the spacer design influence on the optical function may be more pronounced than in one-sided elements.

Figure 22:
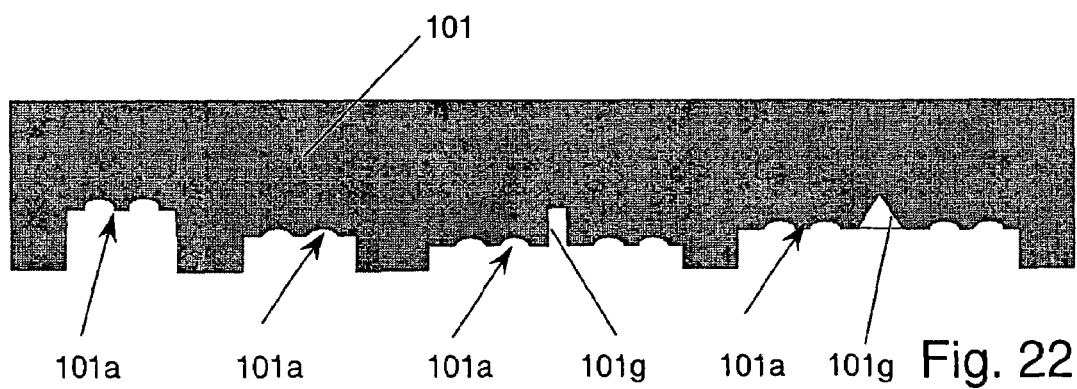
FIG. 22: An example of a multilevel tool with mechanical features.

The replication tool 101 shown—very schematically—in FIG. 22 comprises a spacer portion 1c that is not strictly regular. Further, its replication surface 101a is not confined to one level but instead is a multilevel replication surface. The replication tool 101 further comprises features 101g for forming replicated features having a mechanical function.

The embodiments shown may be varied in many ways. Especially, the described shapes and materials are mere examples; other shapes and materials and material combinations are possible. Especially, masters, sub-masters, tools and/or replicas may be made up of several portions of varying material compositions.

The invention claimed is:

1. A replication process for manufacturing a plurality of optical elements having a structured surface with structural features, comprising the steps of:
   a. providing a replication tool having, on a replication surface, negative structural features being a negative of at least some of the optical element structural features, and further having at least one spacer portion protruding from the replication surface, the at least one spacer portion comprising at least a portion arranged between the structural features corresponding to different optical elements,
   b. providing a substrate comprising a first surface and a material component in a plastically deformable or viscous or liquid state,
   c. bringing said material component in contact with said replication surface while the spacer portion abuts against the first surface of the substrate while the material component is between the replication tool and the substrate and thus replicating from the replication surface, the plurality of optical elements,
   d. hardening the material component, and
   e. removing the replication tool,
   f. wherein the hardened material component adhering to the first surface of the substrate forms the plurality of optical elements.

2. The process according to claim 1, wherein the spacer portion comprises a plurality of spacers arranged in a regular pattern.

3. The process according to claim 1, wherein the spacer portion is contiguous.

4. The process according to claim 1, the replication tool comprising elastomeric material components.

5. The process according to claim 4, wherein the replication tool further comprises a rigid back plate (33).

6. The process according to claim 1, wherein the replication tool further comprises alignment pins.

7. The process according to claim 1, wherein the spacer portion is arranged in a manner that at least one spacer portion border is formed around a replication area in a manner that the spacer portion border at least partially borders the replication area and forms a flow stop or re-directs the liquid material during the replication process.

8. The process of claim 4, wherein the replication tool comprises PDMS.

* * * * *